(12) United States Patent
Tamilarasan et al.

(10) Patent No.: US 11,537,300 B2
(45) Date of Patent: Dec. 27, 2022

(54) IDENTIFYING ALLOCATED BLOCKS IN A STORAGE SYSTEM

(71) Applicant: EMC IP Holding Company LLC, Hopkinton, MA (US)

(72) Inventors: Ashok Tamilarasan, Shrewsbury, MA (US); Philippe Armangau, Acton, MA (US); Vamsi K. Vankamamidi, Hopkinton, MA (US); Samuel L. Mullis, II, Raleigh, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 50 days.

(21) Appl. No.: 17/245,572

(22) Filed: Apr. 30, 2021

(65) Prior Publication Data

US 2022/0350508 A1    Nov. 3, 2022

(51) Int. Cl.
*G06F 3/06* (2006.01)

(52) U.S. Cl.
CPC .......... *G06F 3/0631* (2013.01); *G06F 3/0604* (2013.01); *G06F 3/0632* (2013.01); *G06F 3/0644* (2013.01); *G06F 3/0689* (2013.01)

(58) Field of Classification Search
CPC ....................................................... G06F 3/06
See application file for complete search history.

(56) References Cited

U.S. PATENT DOCUMENTS 9,823,863 B1*  11/2017  Lu .......................... G06F 3/0619
2022/0164139 A1*  5/2022  Moshe ................... G06F 3/0629

OTHER PUBLICATIONS

R. Chen et al., "DCR: Deterministic Crash Recovery for NAND Flash Storage Systems," in IEEE Transactions on Computer-Aided Design of Integrated Circuits and Systems, vol. 38, No. 12, pp. 2201-2214, Dec. 2019, doi: 10.1109/TCAD.2018.2878179. (Year: 2019).*

* cited by examiner

*Primary Examiner* — Khoa D Doan
(74) *Attorney, Agent, or Firm* — Krishnendu Gupta; Deepika Bhayana; Derek Lam

(57) ABSTRACT

Techniques are used for identifying allocated blocks in a storage system. The techniques may be used to provide, among other things, retrieval of a value associated with a most recent reinitialization of the storage system. For a tier of user data storage in the storage system, a page of storage with the value and a marker indicating that the page marks an end of storage that has been allocated for the tier of user data storage may be identified. Storage may be allocated from a page immediately preceding the identified page.

16 Claims, 9 Drawing Sheets

IDENTIFYING ALLOCATED BLOCKS IN A STORAGE SYSTEM

BACKGROUND

Technical Field

This application concerns identifying allocated blocks in a storage system, particularly the most recently allocated page in storage that maps logical addresses to physical addresses on disk.

Description of Related Art

A distributed storage system may include a plurality of storage devices to provide data storage to a plurality of hosts. The plurality of storage devices and the plurality of hosts may be situated in the same physical location, or in one or more physically remote locations. The storage devices and the hosts may be connected to one another over one or more computer networks.

To respond to a host request, the storage system determines the logical addresses corresponding to the data desired by the host. The storage system must determine the corresponding physical locations on disk to access the data. The relationships between logical and physical addresses may be stored in a map. Such information may be considered metadata, and thus stored on a metadata tier of storage. The storage system may allocate pages of storage for storing the map.

It is noted that the terms "storage device(s)", "drive(s)", and "disk(s)" are employed herein interchangeably, even though it is well known that not all physical storage devices or drives include rotating disks.

SUMMARY OF THE INVENTION

One aspect of the current technique is a method for identifying allocated blocks in a storage system. The method includes retrieving a value associated with a most recent reinitialization of the storage system. The method also includes identifying, for a tier of user data storage in the storage system, a page of storage with the value and a marker indicating that the page marks an end of storage that has been allocated for the tier of user data storage. The method further includes allocating storage from a page immediately preceding the identified page.

The value retrieved may be a timestamp. To identify the page of storage with the value and the marker, an anchor page for the tier of user data storage may be determined and a pointer to a page may be retrieved from the anchor page. The page associated with the pointer is verified for including the value and the marker. If the page does not include the value, the marker, or both, searching may be conducted for a page that does include the timestamp and the marker. Determining the anchor page for the tier of user data storage may include accessing a superblock associated with the tier of user data storage to retrieve a pointer to an anchor page.

The method may include determining that all of the storage on the page immediately preceding the identified page has been allocated; writing the value and the marker to the page immediately succeeding the identified page; and allocating storage from the identified page. On the identified map, the value and the marker may be overwritten with structures for the map. The method may include reinitializing the storage system, and storing, for each tier of user data storage, a value associated with the reinitialization of the storage system in a superblock, an anchor page, and a page with the marker.

Another aspect of the current technique is a system with at least one processor. The at least one processor is configured to retrieve a value associated with a most recent reinitialization of the storage system; identify, for a tier of user data storage in the storage system, a page of storage with the value and a marker indicating that the page marks an end of storage that has been allocated for the tier of user data storage; and allocate storage from a page immediately preceding the identified page. The at least one processor may be configured to perform any other processes in conformance with the aspect of the current techniques described above.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
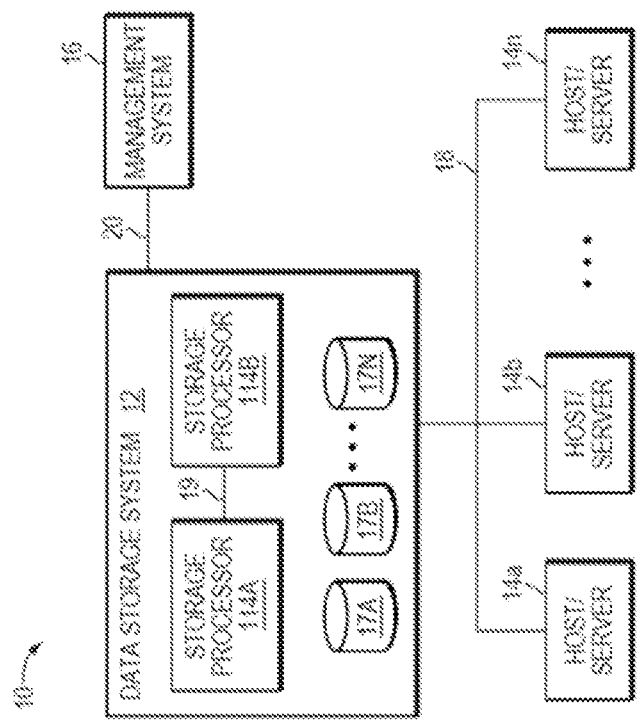
FIG. 1 depicts an exemplary embodiment of a computer system that may utilize the techniques described herein.

Described below is a technique which may be used to provide, among other things, retrieving a value associated with a most recent reinitialization of the storage system; identifying, for a tier of user data storage in the storage system, a page of storage with the value and a marker indicating that the page marks an end of storage that has been allocated for the tier of user data storage; and allocating storage from a page immediately preceding the identified page.

Storage systems, such as log structured file systems, may store metadata and user data, among other types of data. Storage space on the storage devices may be organized into tiers, depending on the type of information being stored therein (e.g., boot tier, metadata tier, user data tier). The storage space dedicated to user data may be further organized into tiers, depending on the temperature of the data (e.g., how often the data is accessed), and the tiers in this context will be referred to herein as "tiers of user data storage". In this manner, any user data stored on the storage system belongs in the user data tier, and may itself pertain to one of the tiers among those dedicated to user data.

A storage system may maintain a map that translates the logical addresses of user data into their corresponding physical addresses. Storage dedicated to metadata may be allocated for the map, and as additional user data is received, more storage may be allocated to accommodate the additional structures needed for the map. The map may reside on a metadata tier, boot tier, or both.

When allocating more storage for the map, the storage system needs to be able to identify where the storage already allocated to the map ends. Each tier of user data storage may have a corresponding anchor page that identifies, for the tier, the last page allocated to the map. However, anchor pages can become corrupted so as to render its identification of a last page unreliable. If the last page cannot be accurately identified, the storage system may accidentally overwrite valid mapping structures by allocating storage earlier than the true last page. Alternatively, if allocations begin after the true last page, storage between the true last page and the newly allocated page may be orphaned and thus, wasted.

Additionally, when the storage system is performing recovery, the map must be cross verified with pages that have been initialized. A corrupt anchor page poses multiple problems. First, as in normal operations, the storage system does not know where to begin allocating new pages for the map. Furthermore, if the entire metadata/boot tier needs to be scanned to find the last allocated page, performance of the recovery process suffers. Moreover, a full scan might not identify the true last page. Each time the storage system reinitializes, pages are re-allocated to build the map corresponding to a given tier of user data, but the contents of the pages may not be reset. Because pages thus retain data stored prior to the reinitialization, pages that appear to be the last allocated page may actually be artifacts from previous reinitializations of the system. The storage system may erroneously identify one of these pages as the true last page and overwrite/orphan storage space.

Techniques described herein compensate for the complications posed by corrupted anchor pages and storage system reinitializations. Each time the storage system is reinitialized, a value associated with the reinitialization, such as a timestamp, is stored in one or more superblocks for the tiers of user data storage. The value may also be stored in the anchor pages. As the storage system allocates storage for the map, the timestamp and the marker identifying a page as the end of storage that has been allocated for a particular tier of user data are added to the beginning of the next page. As pages are filled with map structures, the timestamp and marker are written to new pages and copies of the same are overwritten on previous pages.

Consequently, whenever the storage system needs to identify the end of allocated storage for the map, the storage system accesses the superblock for a tier of user data storage to find the timestamp of the most recent reinitialization, as well as the anchor page. The potential last used page is retrieved based on the anchor page. If the last used page includes both the marker and the timestamp of the most recent reinitialization, then the storage system has identified the position from which additional storage may be allocated.

If the anchor page is corrupted, then the purported last used page that the anchor page references will not have the marker, the same timestamp as the superblock, or both. Then, the storage system must scan the tier for the last used page. If the storage system encounters pages with the marker, but the incorrect timestamp, the pages are bypassed as artifacts from previous reinitializations. A page is identified as the true last page if it contains both items.

In at least some implementations in accordance with the techniques as described herein, one or more of the following advantages can be provided: efficient and accurate identification of the last page from which to allocate more storage for the map, preservation of valid data, reductions in orphaned storage space, and improved performance for recovery processes.

FIG. 1 depicts an example embodiment of a computer system 10 that may be used in connection with performing the techniques described herein. The system 10 includes one or more data storage systems 12 connected to server or hosts 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the hosts 14a-14n may access and communicate with the data storage systems 12, and may also communicate with other components (not shown) that may be included in the system 10. In one embodiment, the communication medium 20 may be a LAN connection and the communication medium 18 may be an iSCSI, Fibre Channel, Serial Attached SCSI, or Fibre Channel over Ethernet connection.

Each of the hosts 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of a variety of connections in accordance with the type of communication medium 20. The processors included in the hosts 14a-14n and management system 16 may be any one of a variety of proprietary or commercially available single or multi-processor system, or other type of commercially available processors able to support traffic in accordance with any embodiments described herein.

It should be noted that the particular examples of the hardware and software that may be included in the data storage systems 12 are described herein in more detail, and may vary with each particular embodiment. Each of the hosts 14a-14n, the management system 16 and data storage systems 12 may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts 14a-14n, management system 16, and data storage systems 12 may be connected to their respective communication medium 18, 20 may pass through other communication devices, such as switching equipment that may exist such as a phone line, a repeater, a multiplexer, or even a satellite. In one embodiment, the hosts 14a-14n may communicate with the data storage systems 12 over an iSCSI or a Fibre Channel connection and the management system 16 may communicate with the data storage systems 12 over a separate network connection using TCP/IP. It should be noted that although FIG. 1 illustrates communications between the hosts 14a-14n and data storage systems 12 being over a first communication medium 18, and communications between the management system 16 and the data storage systems 12 being over a second different communication medium 20, other embodiments may use the same connection. The particular type and number of communication mediums and/or connections may vary in accordance with particulars of each embodiment.

Each of the hosts 14a-14n may perform different types of data operations in accordance with different types of tasks. In the embodiment of FIG. 1, any one of the hosts 14a-14n may issue a data request to the data storage systems 12 to perform a data operation. For example, an application executing on one of the hosts 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. The management system 16 may, for example, display information about a current storage volume configuration, provision resources for a data storage system 12, and the like.

Each of the data storage systems 12 may include one or more data storage devices 17a-17n. Unless noted otherwise, data storage devices 17a-17n may be used interchangeably herein to refer to hard disk drive, solid state drives, and/or other known storage devices. One or more data storage devices 17a-17n may be manufactured by one or more different vendors. Each of the data storage systems included in 12 may be inter-connected (not shown). Additionally, the data storage systems 12 may also be connected to the hosts 14a-14n through any one or more communication connections that may vary with each particular embodiment. The type of communication connection used may vary with certain system parameters and requirements, such as those related to bandwidth and throughput required in accordance with a rate of I/O requests as may be issued by the hosts 14a-14n, for example, to the data storage systems 12. It should be noted that each of the data storage systems 12 may operate stand-alone, or may also be included as part of a storage area network (SAN) that includes, for example, other components such as other data storage systems 12. The particular data storage systems 12 and examples as described herein for purposes of illustration should not be construed as a limitation. Other types of commercially available data storage systems 12, as well as processors and hardware controlling access to these particular devices, may also be included in an embodiment.

In such an embodiment in which element 12 of FIG. 1 is implemented using one or more data storage systems 12, each of the data storage systems 12 may include code thereon for performing the techniques as described herein.

Servers or hosts, such as 14a-14n, provide data and access control information through channels on the communication medium 18 to the data storage systems 12, and the data storage systems 12 may also provide data to the host systems 14a-14n also through the channels 18. The hosts 14a-14n may not address the disk drives of the data storage systems 12 directly, but rather access to data may be provided to one or more hosts 14a-14n from what the hosts 14a-14n view as a plurality of logical devices or logical volumes (LVs). The LVs may or may not correspond to the actual disk drives. For example, one or more LVs may reside on a single physical disk drive. Data in a single data storage system 12 may be accessed by multiple hosts 14a-14n allowing the hosts 14a-14n to share the data residing therein. An LV or LUN (logical unit number) may be used to refer to the foregoing logically defined devices or volumes.

The data storage system 12 may be a single unitary data storage system, such as single data storage array, including two storage processors 114A, 114B or computer processing units. Techniques herein may be more generally used in connection with any one or more data storage system 12 each including a different number of storage processors 114 than as illustrated herein. The data storage system 12 may include a data storage array 116, including a plurality of data storage devices 17a-17n and two storage processors 114A, 114B. The storage processors 114A, 114B may include a central processing unit (CPU) and memory and ports (not shown) for communicating with one or more hosts 14a-14n. The storage processors 114A, 114B may be communicatively coupled via a communication medium such as storage processor bus 19. The storage processors 114A, 114B may be included in the data storage system 12 for processing requests and commands. In connection with performing techniques herein, an embodiment of the data storage system 12 may include multiple storage processors 114 including more than two storage processors as described. Additionally, the two storage processors 114A, 114B may be used in connection with failover processing when communicating with the management system 16. Client software on the management system 16 may be used in connection with performing data storage system management by issuing commands to the data storage system 12 and/or receiving responses from the data storage system 12 over connection 20. In one embodiment, the management system 16 may be a laptop or desktop computer system.

The particular data storage system 12 as described in this embodiment, or a particular device thereof, such as a disk, should not be construed as a limitation. Other types of commercially available data storage systems 12, as well as processors and hardware controlling access to these particular devices, may also be included in an embodiment.

In some arrangements, the data storage system 12 provides block-based storage by storing the data in blocks of logical storage units (LUNs) or volumes and addressing the blocks using logical block addresses (LBAs). In other arrangements, the data storage system 12 provides file-based storage by storing data as files within a file system and locating file data using inode structures. In yet other arrangements, the data storage system 12 stores LUNs and file systems, stores file systems within LUNs, and so on.

The two storage processors 114A, 114B (also referred to herein as "SP") may control the operation of the data storage system 12. The processors may be configured to process requests as may be received from the hosts 14a-14n, other data storage systems 12, management system 16, and other components connected thereto. Each of the storage processors 114A, 114B may process received requests and operate independently and concurrently with respect to the other processor. With respect to data storage management requests, operations, and the like, as may be received from a client, such as the management system 16 of FIG. 1 in connection with the techniques herein, the client may interact with a designated one of the two storage processors 114A, 114B. Upon the occurrence of failure of one the storage processors 114A, 114B, the other remaining storage processors 114A, 114B may handle all processing typically performed by both storage processors 114.

Figure 2:
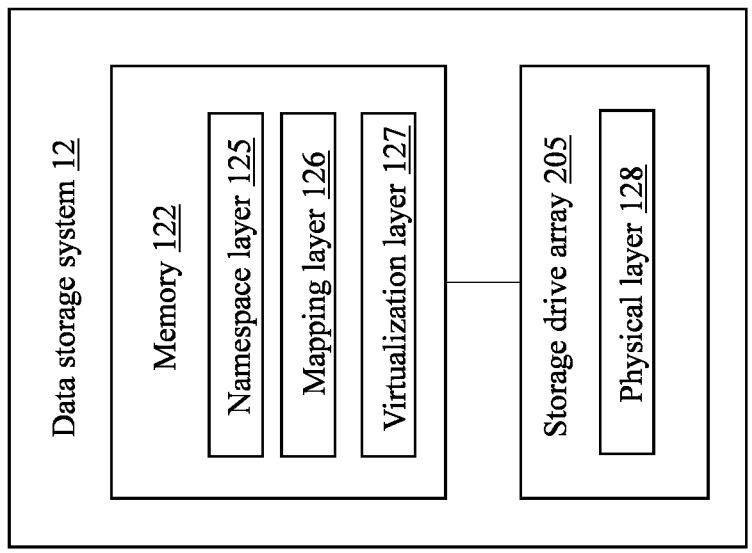
FIG. 2 depicts an exemplary embodiment of a data storage system used in the computer system of FIG. 1.

FIG. 2 depicts an exemplary embodiment of a data storage system 12 used in the computer system 10 of FIG. 1. In addition to the storage processors 114A, 114B and data storage devices 17a-17n depicted in FIG. 1, the data storage system 12 can include a memory 122. The memory 122 can include persistent memory (e.g., flash memory, magnetic memory) and non-persistent memory (e.g., dynamic random access memory (DRAM), static random access memory (SRAM)), and can accommodate a variety of specialized software constructs, including, but not limited to, a namespace layer 125, a mapping layer 126, a virtualization layer 127, a physical layer 128, and/or any other suitable software constructs. Although the embodiment in FIG. 2 shows the namespace layer 125, mapping layer 126, and virtualization layer 127 in memory 122, one or more of these constructs may be stored, in part or in full, on storage devices 17a-17n of the storage drive array 205.

The namespace layer 125 is a logical structure configured to organize storage objects such as virtual volumes (VVOLs), LUNs, file systems, and/or any other suitable storage objects, accessible to the plurality of hosts 14a-14n. The namespace layer 125 can track logical addresses of storage objects, such as offsets into LUNs or file system addresses. For example, if a LUN made up of one or more extents were to have a maximum size of 10 gigabytes (Gb), then the namespace layer 125 may provide a 10 Gb logical address range to accommodate the LUN.

The mapping layer 126 is a logical structure configured to map the logical addresses of the storage objects in the namespace layer 125 to virtualization structures (also referred to herein as "virtual pointers") in the virtualization layer 127. To that end, the mapping layer 126 can include multiple pointer arrays (e.g., indirect pointer arrays) in a mapping hierarchy configured as a multi-level tree. For example, such a pointer array may include a pointer to a child pointer array, and may be pointed to by a pointer in a parent pointer array.

The virtualization layer 127 is a logical structure configured to provide block virtualization. For example, the virtualization layer 127 may have an aggregation of virtual layer blocks (VLBs), each of which may include a plurality of virtual pointers (e.g., 512 virtual pointers). Further, the lowest level of the multi-level tree in the mapping layer 126 may include an array of leaf pointers, each of which may point to one of the virtual pointers included in a respective VLB of the virtualization layer 127.

The physical layer 128 is configured to store an aggregation of physical layer blocks (PLBs). For example, such a PLB may include an aggregation of compressed data blocks, individually compressed data blocks, and/or uncompressed data blocks. Further, each virtual pointer included in a respective VLB of the virtualization layer 127 may point to a data block in a respective PLB of the physical layer 128. It is noted that, although the physical layer 128 is described herein using the term "physical", an underlying storage drive array 205 is typically responsible for the actual, physical storage of host data. The storage drive array 205 can include the storage devices 17a-17n depicted in FIG. 1. The storage drive array 205 may include magnetic disk drives, electronic flash drives, optical drives, and/or any other suitable physical drives. The storage drive array 205 can be attached to one or more I/O channels of the data storage system 12, while also being accessible over the network 18.

Figure 3:
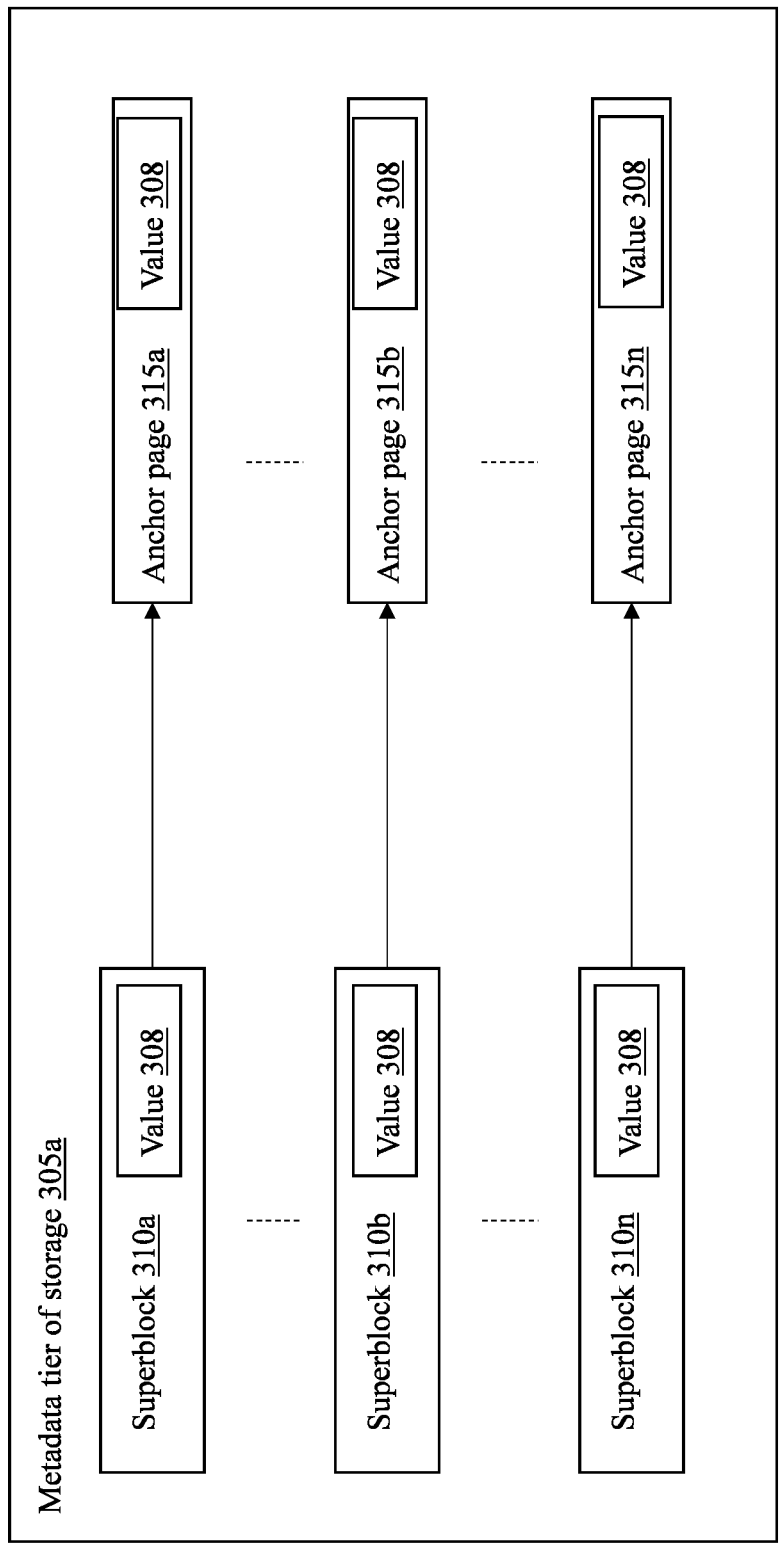
FIG. 3 depicts a schematic diagram of exemplary structures, such as superblocks and anchor pages, that include information about tiers of user data storage.

FIG. 3 depicts a schematic diagram of exemplary structures, such as superblocks 310a-310n and anchor pages 315a-315n, that include information about tiers of user data storage. The superblocks 310a-310n and anchor pages 315a-315n are maintained in a metadata tier of storage 305a. In some embodiments, this metadata tier 305a may be a boot tier, and in further embodiments, the superblocks 310a-310n, the anchor pages 315a-315n, or both may span both a boot tier and a metadata tier 305a of storage. At least one superblock 310 associated with a particular tier of user data storage maintains information about that tier. The superblock 310 stores a value 308 associated with the most recent reinitialization of the storage system 12, such as a timestamp. Every time the storage system 12 reinitializes, the value 308 in each superblock 310a-310n is updated accordingly. A superblock 310a can identify the anchor page 315a for a tier of user data storage. In many embodiments, the superblock 310a stores a pointer to the anchor page 315a. The anchor page 315a stores the value 308, and as with the superblock 310a, this value is updated every time the storage system 12 reinitializes.

Figure 4A:
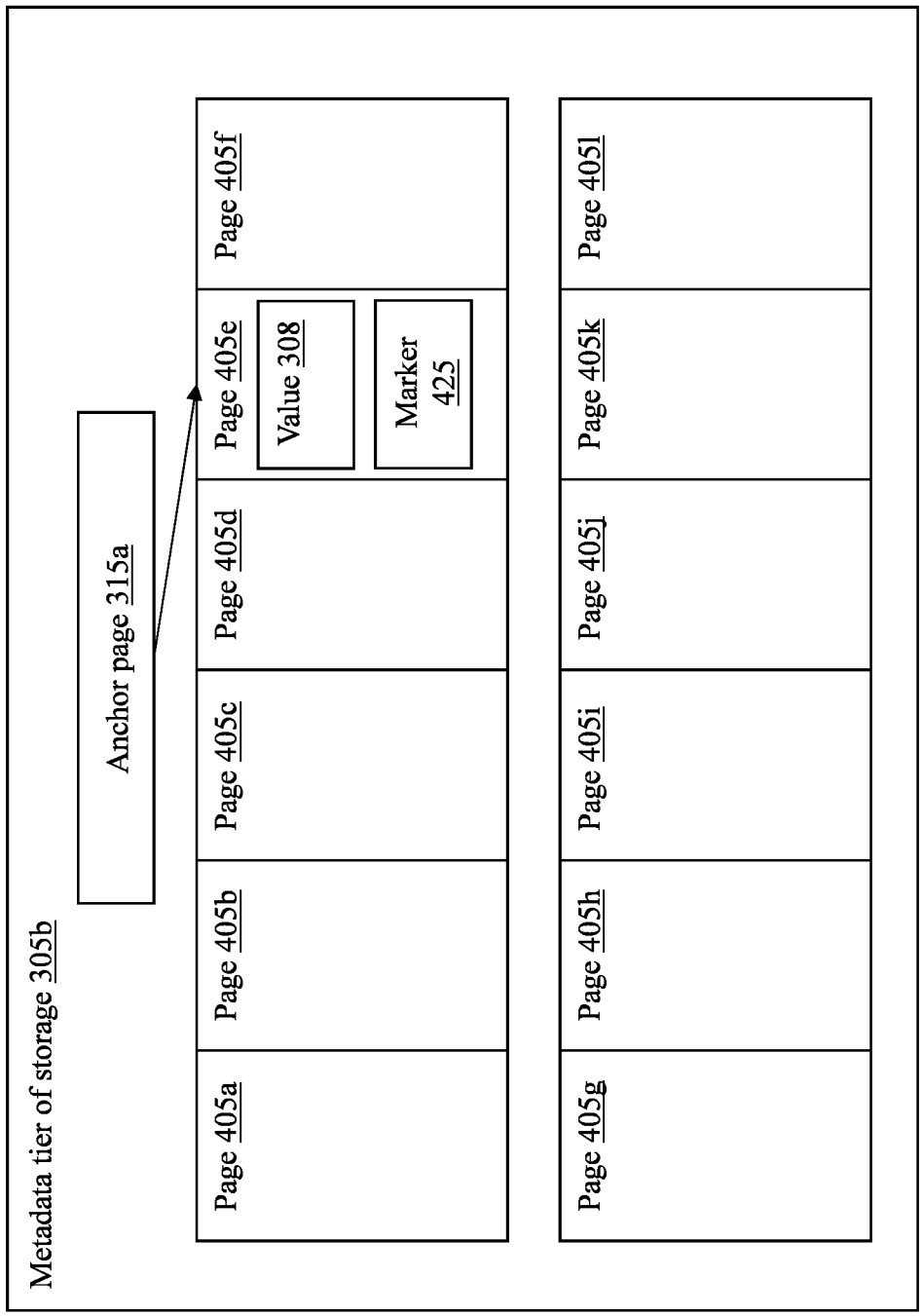
FIGS. 4A-4C depict schematic diagrams that illustrate relationships between the anchor page and storage pages to maintain the map that translates logical addresses into corresponding physical addresses, for various states of the storage system of FIG. 1.
Figure 4B:
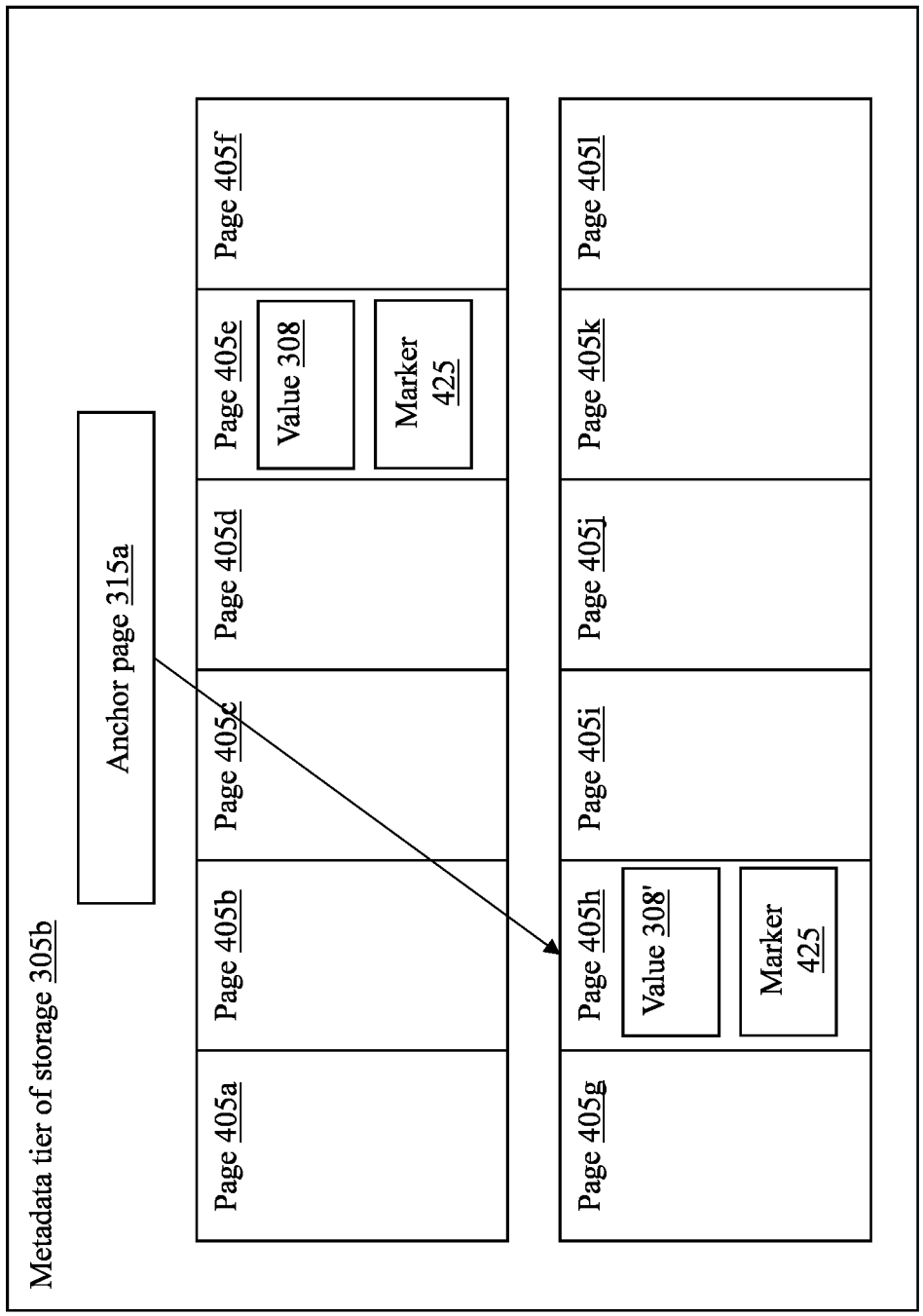
Figure 4C:
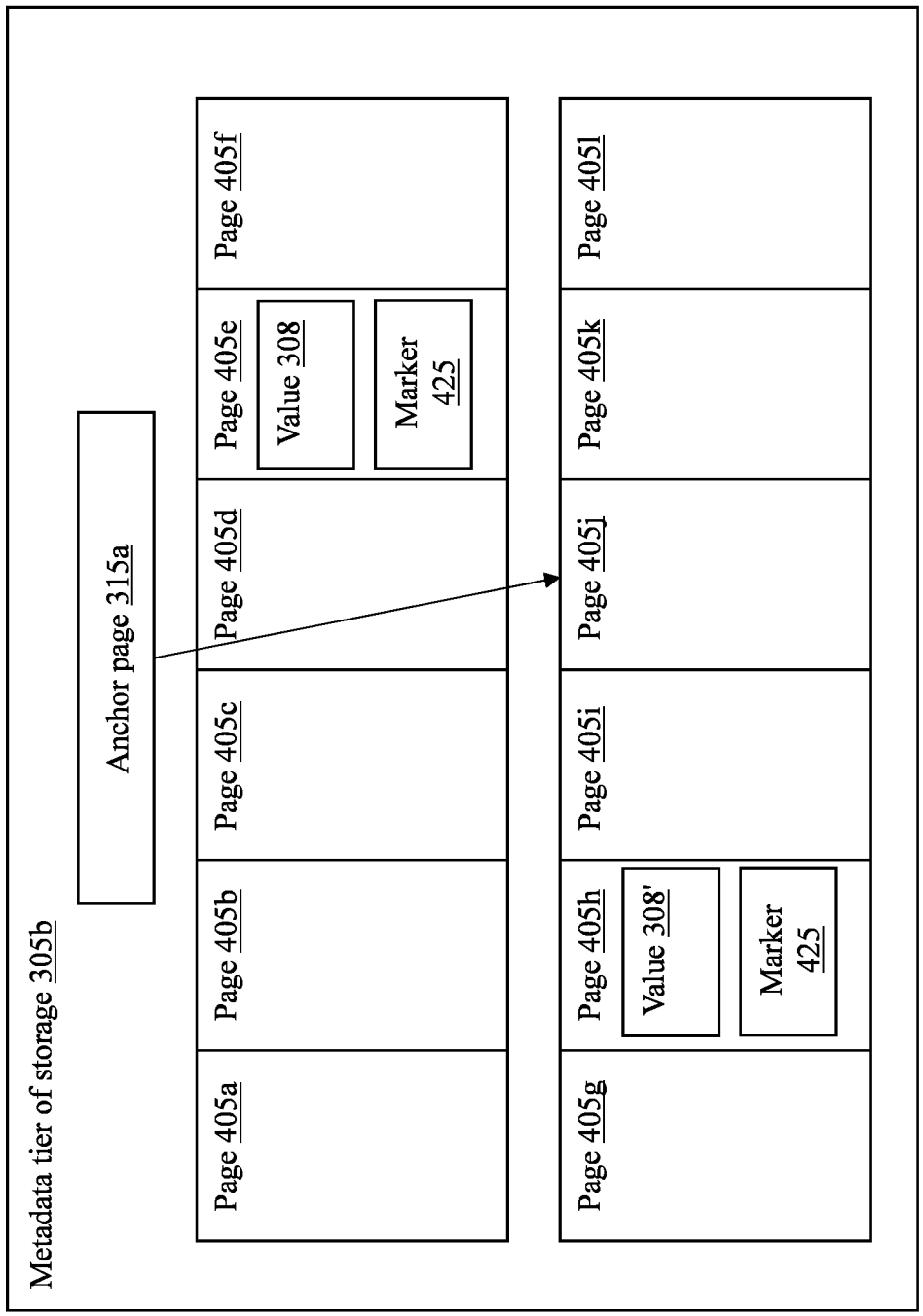

FIGS. 4A-4C depict schematic diagrams that illustrate, for a tier of user data storage, relationships between the anchor page 315a and pages 405a-405l storing the map that translates logical addresses to corresponding physical addresses. The anchor page 315a and pages 405a-405l are maintained in a metadata tier 305b of storage. In some embodiments, the anchor page 315a may be maintained in the boot tier.

In addition to storing the value 308, the anchor page 315a may identify the last page that stores structures for the map by, for example, storing a pointer. In the embodiment depicted in FIG. 4A, the anchor page 315a points to page 405e. The page 405e stores the value 308 and a marker 425 (e.g., a specially formulated bit pattern written to the beginning of the page 405e) indicating that the page 405e marks an end of storage that has been allocated for the map covering the tier of user data storage. In fact, page 405e has not been allocated, whereas the immediately preceding page 405d has been allocated for the map and includes the most recently created map structures. When the storage system 12 needs to allocate more storage for the map, the anchor map 315a advances its pointer to the next page 405f in the metadata tier 405f, writes the value 308 and marker 425 to the page 405f, and begins overwriting contents of the page 405e with new map structures. In this manner, the value 308 and marker 425 on page 405e may be overwritten so the page 405e will not be mistakenly identified as the last used one.

FIGS. 4B-4C illustrates the anchor page 315a and pages 405a-405l of FIG. 4A after at least one reinitialization of the storage system 12. As a result of the reinitialization, the values 308' in the superblock 310a and anchor page 315a have been updated (e.g., the superblock 310a and anchor page 315a now store timestamps corresponding to the most recent reinitialization). Before this process, the last page allocated for the map was page 405e, which stores the value 308 corresponding to a previous reinitialization, as well as the marker 425.

If the anchor page 315a has not been corrupted, as shown in FIG. 4B, the anchor page 315a points to a page 405h that includes both the value 308' that matches the value 308' in the superblock 310a and anchor page 315a, and the marker 425. Thus, the last used page can be identified by accessing the superblock 310a to find the anchor page 315a, accessing the anchor page 315a to identify the last used page 405h, and verifying that the last used page 405h includes the value 308' and the marker 425.

If the anchor page 315a has been corrupted, as shown in FIG. 4C, the anchor page 315a may identify a page 405j as the last used page for the map, but the page 405*j* may not store the marker 425. The storage system 12 may begin scanning the pages 405*a*-405*l* in the metadata tier corresponding to the tier of user data storage. During this scan, the storage system 12 encounters a page 405*e* that includes the marker 425. This page 405*e* may have marked the last allocated page before the storage system 12 was most recently reinitialized. Consequently, its value 308 may not match the corresponding value 308' in at least the superblock 310*a* (and possibly the anchor page 315*a*). Thus, the storage system 12 can determine the page 405*e* is a stale artifact and continue searching for the true last page. When the storage system finds the marker 425 in page 405*h*, the value 308' matching the value 308' in the superblock 310*a* confirms that the page 405*h* is truly the last page allocated for the map.

Figure 5:
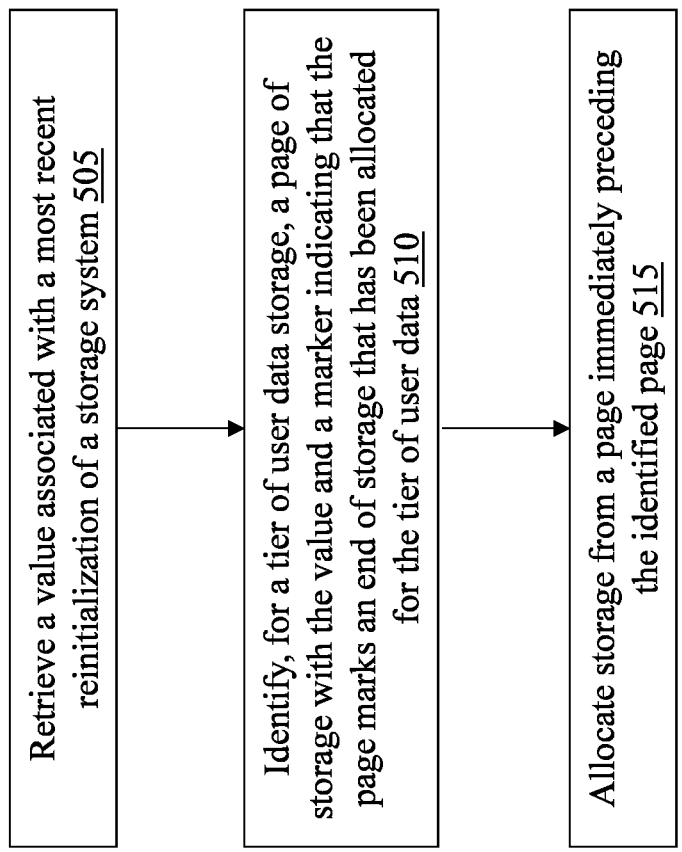
FIG. 5-7 are exemplary flow diagrams of the techniques described herein.
Figure 6:
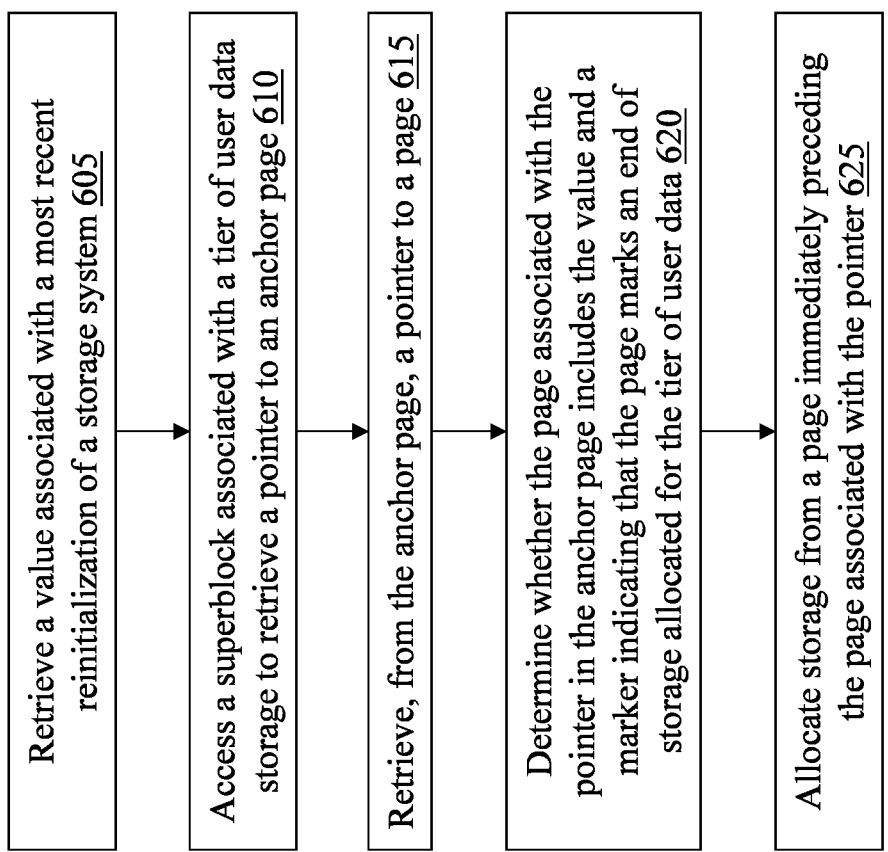
Figure 7:
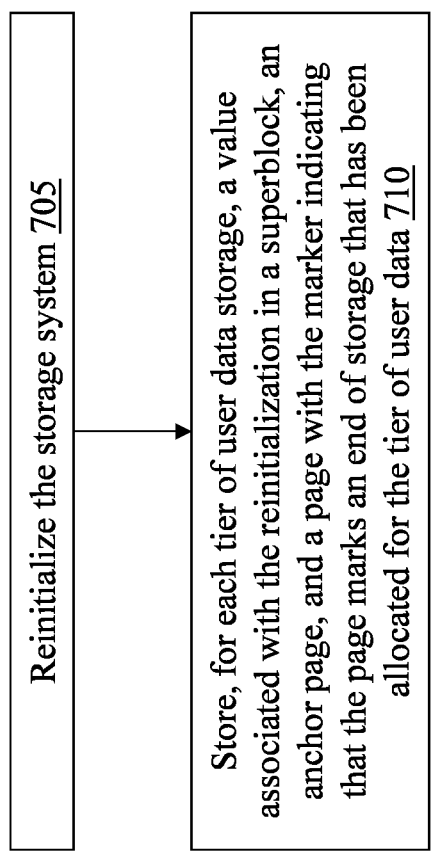

FIGS. 5-7 are exemplary flow diagrams of methods 500-700 describing techniques discussed herein. For the method illustrated in FIG. 5, a value associated with the most recent reinitialization of a storage system is retrieved (step 505). For a tier of user data storage, a page of storage with the value and a marker indicating that the page marks an end of storage that has been allocated for the tier of user data is identified (step 510). Storage is allocated from a page immediately preceding the identified page (step 515).

For the method illustrated in FIG. 6, a value associated with a most recent reinitialization of a storage system is retrieved (step 605). A pointer to an anchor page is retrieved by accessing a superblock associated with a tier of user data storage (step 610). A pointer to a page is retrieved from the anchor page (step 615). It is determined whether the page associated with the pointer in the anchor page includes the value and a marker indicating that the page marks an end of storage allocated for the tier of user data (step 620). Storage is allocated from the page immediately preceding the page associated with the pointer (step 625).

For the method illustrated in FIG. 7, the storage system is reinitialized (step 705). For each tier of user data storage, a value associated with the reinitialization is stored in a superblock, an anchor page, and a page with the marker indicating that the page marks an end of storage that has been allocated for the tier of user data (step 710).

It should again be emphasized that the implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method comprising:
   retrieving a value associated with a most recent reinitialization of the storage system;
   identifying, for a tier of user data storage in the storage system, a page of storage with the value and a marker indicating that the page marks an end of storage that has been allocated for the tier of user data storage; and
   allocating storage from a page immediately preceding the identified page.

2. The method of claim 1, wherein retrieving the value associated with the most recent reinitialization of the storage system comprises:
   retrieving a timestamp.

3. The method of claim 1, wherein identifying the page of storage with the value and the marker comprises:
   determining an anchor page for the tier of user data storage;
   retrieving, from the anchor page, a pointer to a page;
   verifying whether the page associated with the pointer includes the value and the marker.

4. The method of claim 3, wherein determining the anchor page for the tier of user data storage comprises:
   accessing a superblock associated with the tier of user data storage to retrieve a pointer to an anchor page.

5. The method of claim 3, further comprising:
   upon determining that the page associated with the pointer from the anchor page does not include the value or the marker, searching for a page that does include the timestamp and the marker.

6. The method of claim 1, further comprising:
   determining that all of the storage on the page immediately preceding the identified page has been allocated;
   writing the value and the marker to the page immediately succeeding the identified page; and
   allocating storage from the identified page.

7. The method of claim 6, wherein allocating storage from the identified page comprises:
   overwriting the value and the marker on the identified page with structures for the map.

8. The method of claim 1, further comprising:
   reinitializing the storage system;
   storing, for each tier of user data storage, a value associated with the reinitialization of the storage system in a superblock, an anchor page, and a page with the marker.

9. A system comprising at least one processor configured to:
   retrieve a value associated with a most recent reinitialization of the storage system;
   identify, for a tier of user data storage in the storage system, a page of storage with the value and a marker indicating that the page marks an end of storage that has been allocated for the tier of user data storage; and
   allocate storage from a page immediately preceding the identified page.

10. The system of claim 9, wherein the processor is further configured to:
    retrieve a timestamp.

11. The system of claim 9, wherein the processor is further configured to:
    determine an anchor page for the tier of user data storage;
    retrieve, from the anchor page, a pointer to a page;
    verify whether the page associated with the pointer includes the value and the marker.

12. The system of claim 11, wherein the processor is further configured to:
    access a superblock associated with the tier of user data storage to retrieve a pointer to an anchor page.

13. The system of claim 11, wherein the processor is further configured to:
    upon determining that the page associated with the pointer from the anchor page does not include the value or the marker, search for a page that does include the timestamp and the marker.

14. The system of claim 9, wherein the processor is further configured to:
    determine that all of the storage on the page immediately preceding the identified page has been allocated;
    write the value and the marker to the page immediately succeeding the identified page; and
    allocate storage from the identified page.

15. The system of claim 14, wherein the processor is further configured to:
    overwrite the value and the marker on the identified page with structures for the map.

16. The system of claim 9, wherein the processor is further configured to:
    reinitialize the storage system;
    store, for each tier of user data storage, a value associated with the reinitialization of the storage system in a superblock, an anchor page, and a page with the marker.

* * * * *